March 26, 1940.  J. T. CAUTHEN  2,195,144
MEANS FOR PRODUCING SMOOTH SURFACES
Filed Jan. 3, 1938
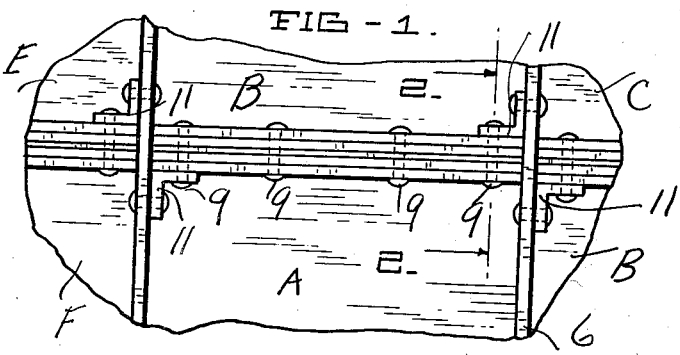
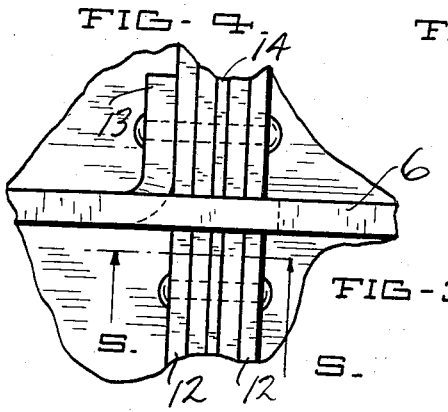
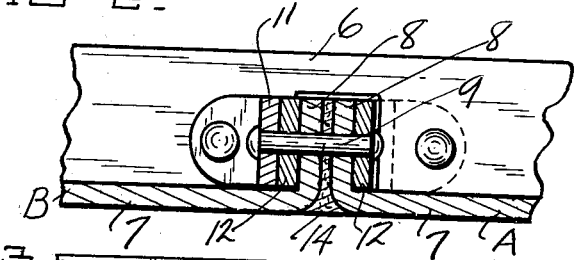
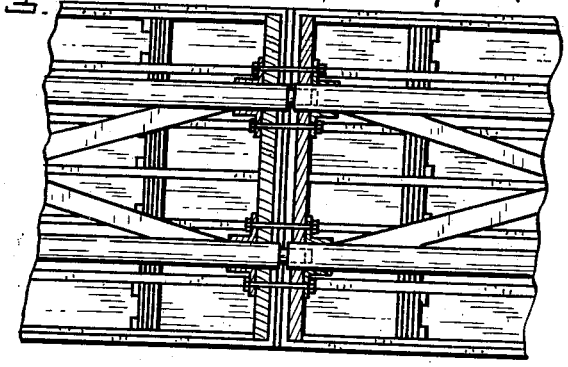
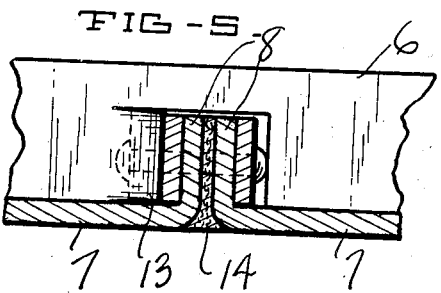
INVENTOR.
JOHN T. CAUTHEN
BY
ATTORNEYS.

Patented Mar. 26, 1940

2,195,144

UNITED STATES PATENT OFFICE 2,195,144

MEANS FOR PRODUCING SMOOTH SURFACES

John T. Cauthen, Brawley, Calif.

Application January 3, 1938, Serial No. 183,211

1 Claim. (Cl. 189—36)

This invention relates to improvements in means for producing smooth surfaces and has particular reference to airplane construction.

The principal object of this invention is to provide a plurality of units which may be associated in edge to edge relation and to seal the seams in such a manner that a smooth outer surface will result.

A further object is to produce a device of this character which is economical to manufacture, and a device which is capable of taking various forms to provide for various contours.

Other objects and advantages will be apparent during the course of the following description.

In the accompanying drawing forming a part of this specification and in which like numerals are employed to designate like parts throughout the same, Fig. 1 is a fragmentary view, showing the rear surface of several units as the same will join together;

Fig. 2 is a cross sectional view taken on the line 2—2 of Fig. 1 and on an enlarged scale;

Fig. 3 is a more detailed view of means for attaching several units together, such as the wing structure of an airplane;

Fig. 4 is a fragmentary detailed view, showing the manner in which the units may be attached to the framework; and Fig. 5 is a cross sectional view taken on the line 5—5 of Fig. 4.

In airplane construction all surfaces which are exposed to the varied air conditions, such as wind, fog, and the like, should be as smooth as possible to prevent undue friction and resultant waste in power. This is particularly true of the body and wings of an airplane.

Applicant has, therefore, devised means for securing smooth units together, each of which units has a smooth surface, which units may in turn be connected to reenforcing frame members of the vehicle, and the joint between the units filled with a plastic composition which may be smoothed off so as to give a perfectly smooth joint between the units.

In the accompanying drawing wherein for the purpose of illustration is shown a preferred embodiment of my invention, the letters A, B, C, D, E, and F designate a portion of six units which are joined together; and the numerals 5 and 6, part of the frame of the vehicle.

My invention consists in bending up small metal units which have an outside surface 7 and upturned flanges 8 around the four edges thereof. In order to secure these flanges 8 together, I employ rivets 9, which in turn engage angles 11, secured to the frame of the vehicle. Reenforcing strips 12 are used to strengthen the joint where required. In some instances, I prefer to bend angle members 13 from the frame of the vehicle, as shown in Fig. 4. The space between the units is filled with plastic material 14, which plastic material permits a certain give between the units but may be polished on its outer surface and in the same plane as the outer surface 7 of the units.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A device of the class described including a main frame, a plurality of units having flanged border sections and capable of being riveted together and to said frame end to end, reinforcing strips arranged alongside said flanged sections, corner bracing angles riveted to said units and to the main frame, and a plastic filler positioned between said flanged border sections to allow of expansion and contraction therebetween and to provide a flush outer finished surface.

JOHN T. CAUTHEN.